Dec. 14, 1954   C. DE BRABANDER ET AL   2,696,655
MAGNETIC ANTIBACKLASH MECHANISM
Filed March 8, 1951

INVENTORS.
CAMIEL DEBRABANDER
FRANK RUDBARG
BY
Thomas B. O'Malley
ATTORNEY.

United States Patent Office 2,696,655
Patented Dec. 14, 1954

2,696,655

MAGNETIC ANTIBACKLASH MECHANISM

Camiel de Brabander, Newport, Del., and Frank Rudbarg, Philadelphia, Pa., assignors to American Viscose Corporation, Wilmington, Del., a corporation of Delaware Application March 8, 1951, Serial No. 214,502

4 Claims. (Cl. 28—71.3)

The present invention relates to improvements in spindle driving mechanisms, and particularly, to the elimination of back-lash resulting from looseness or play within a mechanical drive system for transmitting torque to the spindle. Such back-lash accelerates the wear in a mechanical power transmission, and in many applications results in inferior performance of the equipment being driven as well as products of inferior quality obtained from such equipment. In the manufacturing of viscose rayon yarn, for example, the operation of godet gear boxes without back-lash or "fluttering" is greatly desired when spinning light denier yarn so that the freshly spun filamentary material may be withdrawn from the spinneret and stretched with as little variation in denier as possible. The present invention which involves a magnetic system for producing a light torque load or drag load for opposing the rotation of gears, shafts, etc. and obviously has extensive potential applicability. For purposes of illustration, however, the invention is hereinbelow described with respect to yarn-handling godets such as used in the manufacturing of viscose rayon yarn.

It is an object of the present invention to provide a simple inexpensive drag-producing mechanism for the elimination of back-lash in rotative power transmitting systems. It is also an object to utilize magnetic forces to produce a drag load on rotatable bodies. Still another object is to provide a magnetic retarding structure which may be readily installed on existing power transmission systems without the necessity for extensive modification. Other objects, features and advantages will be apparent from the following description of the invention and the drawing relating thereto in which Fig. 1 is an elevation partially in section of a spindle driving assembly in which the invention is incorporated;

In accordance with the present invention, a drag load may be imposed on a rotary member supported by a non-rotatable member to eliminate back-lash from a mechanical power transmitting system comprising gears, sprockets and the like by securing one or more magnetic elements to either the rotary member or the support member in such a manner as to produce a series of spaced poles disposed in a circular pattern concentrically to the axis of rotation. The member to which magnetic elements are not attached supports a continuous band, annulus, or one or more non-continuous arcuate sections of magnetically-sensitive material concentric with, and adjacent to, the pole faces of the magnetic elements. The embodiments hereinafter described are merely illustrative of the arrangements possible.

Figure 1:
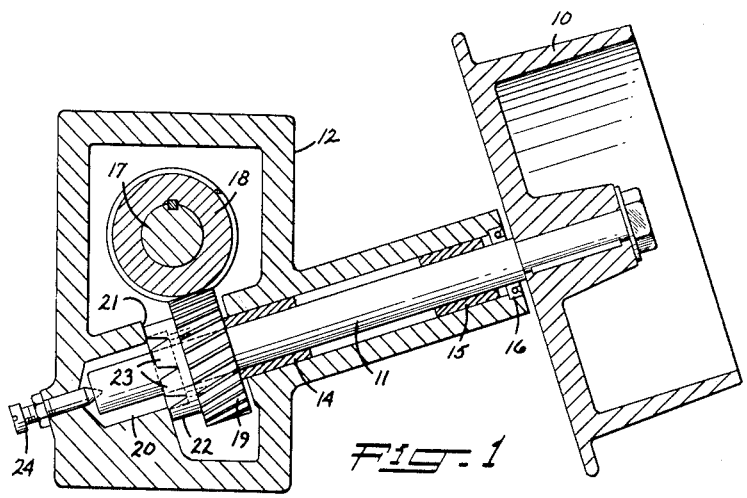
Figure 2:
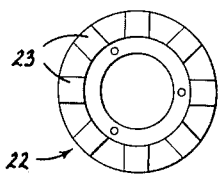
Fig. 2 is an end view of a magnetic member of the apparatus of Fig. 1.
Figure 3:
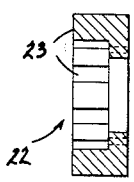
Fig. 3 is a sectional view of the magnetic member.

Fig. 1 illustrates a spindle drive assembly such as is used to support a godet 10 that may be incorporated into equipment for spinning artificial filaments, such as from viscose. The godet 10 is supported on a spindle shaft 11 extending into a housing 12 and supported along a desired axis of rotation by bearings 14 and 15. An annular sealing element 16 prevents the transfer of liquid material into or out of the housing 12. Another shaft 17 extends into the housing in spaced and transverse relationship with respect to the shaft 11. Rotative power is transmitted from the shaft 17 through a worm 18 mounted thereon in mesh with a worm gear 19 supported on the shaft 11.

As shown, the housing 12 has a recess 20 into which extends an end portion of the shaft 11 into engagement with a set screw 24 which serves as an end thrust bearing and may be used to position the shaft in an endwise direction within the housing. An inner flat surface 21 of the housing is parallel to the adjacent face of the gear 19 and spaced therefrom sufficiently to permit attachment to the gear of an annular multiple pole magnetic member 22 having a plurality of axially-extending and angularly spaced permanently-magnetized bosses 23. Adjacent bosses or projections 23 are magnetized with opposite polarity. The shaft 11 may be positioned endwise within the housing by adjustment of the set screw 24 so that the magnetic member 22 rotates with clearance between it and the flat surface 21. If desired, however, frictional drag as well as magnetic drag may be utilized to impose a drag load on the spindle 11, and the member 22 in this case is allowed to rotate in engagement with the surface 21. The housing 12 ordinarily contains a bath of lubricant in which the rotating members are at least partly submerged; thus excessive wear or abrasion of slidably engaged portions of the drag load members is avoided.

Figure 4:
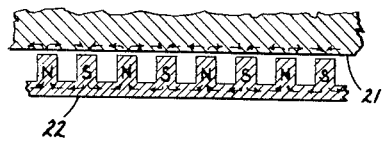
Fig. 4 is a diagrammatic linear development of the magnetic drag load system employed in the apparatus of Fig. 1.

Fig. 4 illustrates a linear development of the member 22 and its relationship with the magnetically-sensitive section of the housing 12 having the surface 21. The composition of magnetic forces which produce the drag force by which back-lash of the spindle 11 and the godet 10 is eliminated is illustrated by the small arrows.

Figure 5:
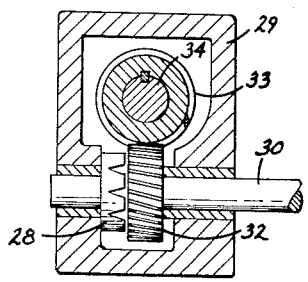
Fig. 5 is an elevation partially in section of a worm drive illustrating an alternative disposition of members of a magnetic drag load system.

The assembly shown in Fig. 1 is normally used in conjunction with another similar assembly (not shown) to forward and stretch a freshly spun yarn. The godets rotate on spaced axes at different peripheral speeds so that the yarn, in passing from one godet to the more rapidly rotating godet, is stretched. Back-lash may not occur to a substantial degree in the spinning of heavy denier yarns but when handling light denier yarns, the strength of the "green" yarn passing between the godets is not sufficient to prevent "fluttering" or back-lash of one or both godets resulting from play in the worm gear drives therefor such as illustrated in Fig. 1. When the speeds of one or both of the godets which forward a single yarn are fluctuating in a range extending above and below a normal speed as the result of back-lash, substantial differences in the stretching of progressive sections of the yarn are obtained with corresponding variations in the denier. A drag system in accordance with the present invention maintains the teeth of the gears in constant engagement and does not add appreciably to the power consumed in driving such godets. If desired, a multiple-pole member such as member 22 of Fig. 1 may be mounted on a surface which is fixed with respect to the non-rotatable support member as shown in Fig. 5 wherein a magnetic drag member 28, similar to member 22 of Fig. 1, is mounted stationarily on the interior wall of a housing 29 concentrically with respect to the axis of a spindle 30. The member 28 is suported adjacent the face of a worm gear 32 comprising a magnetically-sensitive material. A worm 33 in mesh with the worm gear 32 transmits power from a shaft 34 to the spindle 30.

Figure 7:
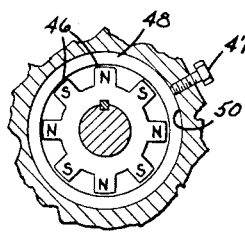
Fig. 7 is a sectional view taken along line VII—VII of Fig. 6.
Figure 6:
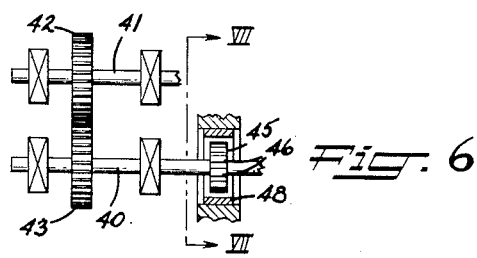
Fig. 6 is a diagrammatic view of a gear transmission assembly in which is incorporated a modified drag load system.

Fig. 6 illustrates an alternative system in accordance with the invention by which a drag load may be developed for the purpose of overcoming the back-lashing of a spindle 40 driven by shaft 41 through spur gears 42 and 43 affixed to the shaft and spindle respectively. A magnetic member 45 having permanently-magnetized radially outward extensions or teeth 46 is secured to the driven spindle 40. Adjacent teeth 46 are impressed with opposite polarity as indicated in Fig. 7. The member 45 rotates at close clearance with an annular member 48 of magnetically-sensitive material. Member 48 may be constructed with an inner diameter providing a minimum practical clearance with the teeth 46 and secured in place by a set screw 47. While member 48 is shown anchored within a housing surface 50 complementary to its exterior surface, the member 45 may be provided in a size suitable for rotating at close clearance with an annular surface of a magnetically-sensitive housing or magnetically-sensitive portion thereof disposed radially outwardly from, and concentrically with the member 45, thus eliminating the need for a separate member.

Figure 8:
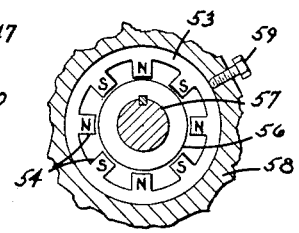
Fig. 8 is a sectional view of a modified drag load system.

Fig. 8 illustrates an alternative drag producing system wherein an exterior stationary annular member 53 is provided with permanently-magnetized teeth 54 which extend radially inwardly from the body of this member into close clearance with a ring-like member 56 of magnetically-sensitive material secured to a shaft 57. Magnetic forces are developed between members 53 and 56 in a manner similar to that illustrated in Fig. 4. If necessary, the member 53 may be positively anchored within a housing 58 by a set screw 59.

Permanently-magnetized members in accordance with the present invention such as typified by member 22 of Figs. 1 to 4, member 45 of Figs. 6 and 7, member 28 of Fig. 5 and member 53 of Fig. 8 may be fabricated from a variety of metallic compositions familiar to those skilled in the forming of magnets. Such magnets are now obtainable in an unlimited variety of shapes and sizes and are commonly formed from alloys of iron with other metals such as nickel, aluminum, copper, cobalt, manganese, chromium, and molybdenum by well-known sintering or casting procedures. Some of such alloy compositions may be found listed in "Metals and Alloys Data Book" (page 132), by S. L. Hoyt, published 1943. While the magnets herein described are shown as unitary in structure, magnets of the type which comprise an annular holder and a plurality of magnetic pole elements secured to the holder to provide a plurality of pole faces in a manner known to the art may also be used.

While preferred embodiments of the invention have been shown and described, it is to be understood that changes and variations may be made without departing from the spirit and scope of the invention as defined in the appended claims.

We claim:

1. In spinning apparatus comprising a pair of godets, means for supporting the godets on fixed axes in spaced yarn-transferring relationship whereby one godet receives the yarn from the other, and means for driving the godets at different peripheral speeds, said first-mentioned godet being driven more rapidly to stretch the yarn passing thereto from the other godet; the combination with the godets and the driving means of a magnetic system for preventing back-lash in the transmission of power through the driving means comprising a permanently magnetized portion having spaced circularly disposed pole elements in concentric relationship with each axis and an arcuate magnetically-sensitive portion in opposed concentric relationship with said elements, adjacent elements of said pole elements being opposite in polarity, one of each pair of the opposed portions of the magnetic system being held from rotation and the other portion of each pair being connected with a godet for rotation therewith.

2. In spinning apparatus comprising a pair of godets, means for supporting the godets on fixed axes in spaced yarn-transferring relationship whereby one godet receives the yarn from the other, and means for driving the godets at different peripheral speeds, the first-mentioned godet being driven more rapidly to stretch the yarn passing thereto from the other godet; the combination with the godets and the driving means of a magnetic system for preventing back-lash in the transmission of power through the driving means and the connection thereof with the godet comprising an annular magnet portion in concentric relationship with each axis, and an annular band portion of magnetically-sensitive material in concentric relationship with each magnet portion, said magnet portion having a plurality of pole elements spaced along a circumference thereof in opposed relationship to a circumference of the band portion, adjacent elements of said pole elements being opposite in polarity, and one of each pair of the opposed portions of the magnetic system being affixed to the supporting means and the other portion of each pair being connected with a godet for rotation therewith.

3. In spinning apparatus comprising a pair of godets, a pair of shafts, each godet being mounted on one of the shafts, bearings for supporting the godets on fixed axes in spaced yarn-transferring relationship whereby one godet receives the yarn from the other, and means for driving the godets at different peripheral speeds, said first mentioned godet being driven more rapidly to stretch the yarn passing thereto from the other godet; the combination with the godets and the driving means of a magnetic system for preventing back-lash in the transmission of power through the driving means and the connection thereof with the godets comprising two pairs of annuli, each pair of annuli being supported concentrically with respect to a separate shaft, one annulus of each pair being a magnet having pole elements spaced along a circumference thereof and the other annulus being a band of magnetically-sensitive material, one annulus of each pair being associated with the coaxially related shaft for rotation therewith and the other annulus of the pair being mounted on the bearing associated with the first named annulus.

4. In spinning apparatus comprising a godet, means for supporting the godet on a fixed axis, means mounted in spaced relationship with the godet for supplying yarn thereto at a predetermined rate, and means for driving the godet at a higher peripheral rate than said predetermined rate; in combination with the driving means and the godet, a magnetic system for preventing back-lash of the godet with respect to parts of said driving means comprising a permanently magnetized portion having spaced circularly-disposed pole elements in concentric relation with an axis of rotation of said driving means, and an arcuate magnetically-sensitive portion in opposed concentric relation with said elements, adjacent elements of said pole elements being opposite in polarity, one of said opposed portions of the magnetic system being held from rotation and the other portion being connected in driving relation with the godet for rotation therewith.

References Cited in the file of this patent

UNITED STATES PATENTS

| Number | Name | Date |
|---|---|---|
| 1,652,362 | Joyce | Dec. 13, 1927 |
| 1,870,000 | Cunningham et al. | Aug. 2, 1932 |
| 2,129,529 | Howard | Sept. 6, 1938 |
| 2,255,420 | Graham | Sept. 9, 1941 |
| 2,257,300 | Hines | Sept. 30, 1941 |
| 2,293,748 | Johnson | Aug. 25, 1942 |
| 2,371,511 | Faus | Mar. 13, 1945 |
| 2,402,609 | Brabander | June 25, 1946 |
| 2,458,759 | Abell | Jan. 11, 1949 |
| 2,463,409 | Moody | Mar. 1, 1949 |
| 2,465,932 | Romine | Mar. 29, 1949 |
| 2,519,882 | Bullard | Aug. 22, 1950 |
| 2,550,861 | Ransom | May 1, 1951 |